(12) United States Patent
Brown

(10) Patent No.: US 6,566,437 B2
(45) Date of Patent: May 20, 2003

(54) WEAR-RESISTANT COATING COMPOSITION AND METHOD OF PRODUCING A COATING

(75) Inventor: Ward Thomas Brown, North Wales, PA (US)

(73) Assignee: Rohm and Haas Company, Philadelphia, PA (US)

( * ) Notice: Subject to any disclaimer, the term of this patent is extended or adjusted under 35 U.S.C. 154(b) by 207 days.

(21) Appl. No.: 09/846,671

(22) Filed: May 1, 2001

(65) Prior Publication Data

US 2002/0007001 A1 Jan. 17, 2002

Related U.S. Application Data

(60) Provisional application No. 60/209,354, filed on Jun. 5, 2000.

(51) Int. Cl.$^7$ .............................................. C08L 83/00
(52) U.S. Cl. ....................... 524/506; 524/502; 524/588; 524/599; 524/606; 524/612
(58) Field of Search ................................. 524/502, 588, 524/599, 606, 612, 506

(56) References Cited

U.S. PATENT DOCUMENTS

| | | | |
|---|---|---|---|
| 4,487,964 A | 12/1984 | Watson, Jr. et al. | ........ 564/252 |
| 4,649,170 A | 3/1987 | Reid | ........................... 524/247 |
| 5,047,588 A | 9/1991 | Taylor | ........................ 564/252 |
| 5,066,705 A | 11/1991 | Wickert | ....................... 524/457 |
| 5,104,928 A | 4/1992 | Craun et al. | ................. 524/773 |
| 5,258,481 A | * 11/1993 | Hesselmans et al. | .......... 528/28 |

FOREIGN PATENT DOCUMENTS

| | | |
|---|---|---|
| CA | 2000607 A | 10/1989 |
| EP | 0 259 511 A1 | 3/1988 |
| EP | 0 274 402 A2 | 7/1988 |
| EP | 0 277 361 A1 | 8/1988 |
| EP | 0 449 143 A2 | 10/1991 |
| EP | 0628 582 B1 | 12/1994 |
| EP | 0874011 A | 10/1998 |
| WO | WO 93/22282 | 11/1993 |

* cited by examiner

Primary Examiner—David W. Wu
Assistant Examiner—William Cheung

(57) ABSTRACT

A wear-resistant aqueous coating composition and a method for producing a wear-resistant coating are disclosed. In particular, the present invention relates to aqueous coating compositions which include a polycarbodiimide, an emulsion polymer having multiple functional groups reactive with carbodiimide moieties, and an alkoxysilane which is either reactive with the aqueous emulsion polymer, reactive with the polycarbodiimide, or attached to the polycarbodiimide.

15 Claims, No Drawings

WEAR-RESISTANT COATING COMPOSITION AND METHOD OF PRODUCING A COATING

CROSS REFERENCE TO RELATED PATENT APPLICATIONS

This is a non-provisional application of prior U.S. provisional application Ser. No. 60/209,354 filed Jun. 05, 2000.

The present invention relates to coating compositions and a method for producing wear-resistant coating compositions. In particular, the present invention relates to aqueous coating compositions which include an aqueous emulsion polymer having at least two functional groups reactive with carbodiimide moieties, a polycarbodiimide, and an alkoxysilane which is either part of the polycarbodiimide, reactive with the polycarbodiimide, or reactive with the aqueous emulsion polymer.

Traffic marking paints are applied to roads, parking lots, and the like, typically concrete and asphalt surfaces, to instruct users and to demarcate traffic lanes, parking spaces, and the like. As the replacement of solvent-borne paints continues in order to minimize air pollution, aqueous traffic marking compositions having a useful balance of dried film properties have been sought. One of the most important properties of traffic marking compositions is the wear-resistance of the dried coating under use conditions. The greater the wear-resistance, the longer the useful lifetime of the composition.

U.S. Pat. Nos. 5,047,588, 5,104,928, 4,487,964, 4,649,170, 5,066,705, 5,047,588, World Patent No. 93/22,282, Canadian Patent No. 2,000,607, and EP-B-0,628,582, EP-B-0,277,361, EP-B-0,274,402, EP-B-0,259,511, and EP-B-0,449,143 disclose two-pack aqueous coating compositions which include water-dispersible, carboxylic acid-functional polymers and a polycarbodiimide. However, none of these sources discloses the use of reactive alkoxysilanes in conjunction with polycarbodiimides, which is required to produce the improved durability.

U.S. Pat. No. 5,258,481 discloses two-pack aqueous coating compositions which include water-dispersible carboxylic acid functional polymers and an alkoxysilane-functional polycarbodiimide. However, this reference does not disclose the use of such compositions as traffic markings, nor does it disclose the utility of such coatings when applied to cementitious or mineral surfaces with which the alkoxysilane-functional polycarbodiimides are believed to react.

I have made the surprising finding that combining: a polycarbodiimide having at least two carbodiimide groups; an aqueous emulsion polymer bearing at least two functional groups reactive with carbodiimide and at least one functional group reactive with an alkoxysilane; and an alkoxysilane bearing at least one functional group reactive with the emulsion polymer results in an aqueous coating composition that readily crosslinks during application and drying to form a durable coating. Similarly, I have found that polycarbodiimides, alkoxysilanes reactive with carbodiimide moieties, and aqueous emulsion polymer having multiple functional groups reactive with carbodiimide moieties may be combined to form a coating composition such that, even in the presence of water, the reactive species combine to form crosslinks during application of the composition to and drying of the resultant coating upon the surface of a substrate, thereby hardening the coating and rendering it highly wear resistant. In addition, I have found that polycarbodiimides bearing alkoxysilane groups may be combined with aqueous emulsion polymer bearing multiple groups reactive with carbodiimide to form an aqueous traffic marking composition that crosslinks during application to road surfaces, thereby hardening the traffic marking and rendering it highly wear resistant.

While not wishing to be bound by theory, it is believed that a substantial portion of the enhanced durability observed for the traffic markings of this invention derives from formation of covalent bonds between the alkoxysilane groups and hydroxyl groups resident on cement and asphalt surfaces. Those covalently bound alkoxysilane groups are themselves linked to the binder polymer of the coating, effectively linking the entire coating to the road surface. While the compositions of the present invention are particularly useful as traffic marking compositions and the methods of the present invention are particularly useful for forming traffic markings, the compositions and methods are also generally useful as coating compositions and methods of forming coatings on a wide variety of substrate surfaces.

The first aspect of the present invention relates to an aqueous coating composition including:
  (a) a polycarbodiimide having at least two carbodiimide groups;
  (b) an aqueous emulsion polymer; and
  (c) an alkoxysilane;
    wherein the aqueous emulsion polymer has at least two functional groups reactive with the carbodiimide groups and at least one functional group reactive with the alkoxysilane; and
    wherein the alkoxysilane has at least one functional group reactive with the aqueous emulsion polymer.

A second aspect of the present invention relates to a method for producing a wear-resistant coating on a surface of a substrate including:
  (1) applying to the surface a layer of coating composition including:
    (a) a polycarbodiimide having at least two carbodiimide groups;
    (b) an aqueous emulsion polymer; and
    (c) an alkoxysilane;
      wherein the aqueous emulsion polymer has at least two functional groups reactive with the carbodiimide groups and at least one functional group reactive with the alkoxysilane; and
      wherein the alkoxysilane has at least one functional group reactive with the aqueous emulsion polymer; and
  (2) allowing the coating composition to dry.

A third aspect of the present invention is directed at a method for producing a wear-resistant coating on a surface of a substrate including:
  (1) applying to the surface a layer of coating composition including:
    (a) a polycarbodiimide having at least two carbodiimide groups;
    (b) an aqueous emulsion polymer; and
    (c) an alkoxysilane;
      wherein the aqueous emulsion polymer has at least two functional groups reactive with the carbodiimide groups; and
      wherein the alkoxysilane has least one functional group reactive with the carbodiimide groups; and
  (2) allowing the aqueous coating composition to dry.

A fourth aspect of the present invention is a method for producing a wear-resistant traffic marking on a road surface including:
  (1) applying to the road surface a layer of a traffic marking composition comprising:

(a) an aqueous emulsion polymer; and
(b) a polycarbodiimide having at least two carbodiimide groups;
   wherein the aqueous emulsion polymer has at least two functional groups reactive with the carbodiimide groups; and
   wherein the polycarbodiimide has at least one alkoxysilane group; and
(2) allowing the traffic marking composition to dry.

The polymer of the present invention is referred to herein as a "binder polymer". The specific method by which a binder polymer is prepared is not of particular importance to the present invention. Binder polymers useful in the compositions of the present invention may be prepared via bulk and solution polymerization, and by aqueous dispersion, suspension, and emulsion polymerization, or any other method that would produce the desired polymer dispersed in water, or capable of being dispersed in water. A preferred method for preparing the binder polymers to be used in wear-resistant traffic marking compositions of the present invention is aqueous emulsion polymerization. Polymers thus prepared are usually stabilized by adding anionic, nonionic, cationic, or amphoteric surfactants, or by the incorporation of anionic or cationic moieties into the polymer itself during synthesis. The emulsion polymerization can be carried out by a number processes such as those described in Blackley, D. C. *Emulsion Polymerisation;* Applied Science Publishers: London, 1975; Odian, G. *Principles of Polymerization;* John Wiley & Sons: New York, 1991; *Emulsion Polymerization of Acrylic Monomers;* Rohm and Haas, 1967.

The aqueous emulsion polymer useful in the present invention is an addition polymer having at least two functional groups reactive with carbodiimide, and optionally at least one functional group reactive with the alkoxysilane. The monomers from which the addition polymer is formed are ethylenically-unsaturated. The aqueous emulsion polymer composition may be selected and the polymer prepared by conventional techniques known to those of ordinary skill in the art. The polymer may contain, as polymerized units, one or more ethylenically unsaturated monomers. Examples of these ethylenically unsaturated monomers include: $C_1$-$C_{22}$ linear or branched chain alkyl (meth)acrylates, bornyl (meth)acrylate, isobornyl (meth)acrylate, and the like; hydroxyethyl (meth)acrylate, hydroxypropyl (meth)acrylate; (meth)acrylamide or substituted (meth)acrylamides; styrene or substituted styrenes; butadiene; vinyl acetate or other vinyl ester; butylaminoethyl (meth)acrylate, di(methyl)aminoethyl (meth)acrylate; a monomer containing α,β-unsaturated carbonyl functional groups such as fumarate, maleate, cinnamate and crotonate; and (meth)acrylonitrile. Used herein, the word fragment "(meth)acryl" refers to both "methacryl" and "acryl". For example, (meth)acrylic acid refers to both methacrylic acid and acrylic acid, and methyl (meth)acrylate refers to both methyl methacrylate and methyl acrylate.

A acid-functional monomers of the binder polymer of the present invention may also be present as polymerized units at preferably 0–10% by weight, based on the weight of the dry emulsion polymer. Acid-functional monomers useful in the present invention include, for example, (meth)acrylic acid, itaconic acid, crotonic acid, phosphoethyl (meth)acrylate, sulfoethyl (meth)acrylate, 2-acrylamido-2-methyl-1-propanesulfonic acid, fumaric acid, maleic anhydride, monomethyl maleate, and maleic acid.

Optionally, a low level of a multi-ethylenically unsaturated monomer may be incorporated into the polymer to provide crosslinking. The level of multi-ethylenically unsaturated monomer may be 0–5% by weight, based on the weight of the dry emulsion polymer. The upper limit is typically determined by the point at which film formation becomes impaired. Useful multi-ethylenically unsaturated monomers include, for example, allyl (meth)acrylate, diallyl phthalate, 1,4-butylene glycol di(meth)acrylate, 1,6-hexanediol di(meth)acrylate, and trimethylolpropane tri (methyl)acrylate.

Carboxylic acid monomers are preferred for incorporation into the aqueous emulsion polymer to react with carbodiimide functionality. The preferred level of carboxylic acid containing monomers, as polymerized units, is 0.1 to 10%, more preferably 0.5 to 5%, and most preferably 1 to 3%, all by weight based on total weight of dry emulsion polymer.

Preferred optional functional groups reactive with alkoxysilane incorporated in the aqueous emulsion polymer are carboxylic acid or amine groups. The preferred level of carboxylic acid or amine group-containing monomers such as, for example, (meth)acrylic acid, dimethylaminoethyl (meth)acrylate, or (meth)acrylic acid post-functionalized with an aziridine, is 0.1 to 10%, more preferably 0.5 to 5%, and most preferably 1 to 3%, all by weight based on total weight of dry emulsion polymer.

Conventional surfactants may be used to stabilize the emulsion polymerization systems before, during, and after polymerization of monomers. These conventional surfactants will usually be present at levels of 0.1 percent to 6 percent by weight based on the weight of total monomer. At least one anionic, nonionic, or amphoteric surfactant may be used, or mixtures thereof. Alternatively, all, or a portion, of the surfactant activity may be provided by initiator fragments, such as those of persulfates, when the fragments become incorporated into the polymer chain. Examples of anionic emulsifiers include sodium lauryl sulfate, sodium dodecyl benzene sulfonate, dioctylsulfosuccinate, sodium polyoxyethylene lauryl ether sulfate, and sodium salt of tert-octylphenoxyethoxypoly(39)ethoxyethyl sulfate. Examples of nonionic surfactants include glycerol aliphatic esters, oleic acid monoglyceride, polyoxyethylene aliphatic esters, polyoxyethylene glycol monostearate, polyoxyethylene cetyl ether, polyoxyethylene glycol monolaurate, polyoxyethylene glycol monooleate, polyoxyethylene glycol stearate, polyoxyethylene higher alcohol ethers, polyoxyethylene lauryl ether, polyoxyethylene nonylphenol ether, polyoxyethylene octylphenol ether, polyoxyethylene oleyl ether, polyoxyethylene stearyl ether, polyoxyethylenesorbitan aliphatic esters, polyoxyethylenesorbitan monolaurate, polyoxyethylenesorbitan monooleate, polyoxyethylenesorbitan monopalmitate, polyoxyethylenesorbitan monostearate, polyoxyethylenesorbitan trioleate, polyoxyethylenesorbitan tristearate, polyoxyethylenesorbitol tetraoleate, stearic acid monoglyceride, tert-octylphenoxyethylpoly(39) ethoxyethanol, and nonylphenoxyethylpoly(40) ethoxyethanol.

Amphoteric surfactants may also be utilized solely, or in combination with anionic surfactants, nonionic surfactants, or mixtures thereof, to stabilize particles of the polymer during and after aqueous emulsion polymerization, or other dispersion polymerizations. For the purpose of stabilizing particles of polymer in aqueous systems, amphoteric surfactants may be used at levels of 0.1 percent to 6 percent by weight based on the weight of total monomer. Useful classes of amphoteric surfactant include aminocarboxylic acids, amphoteric imidazoline derivatives, betaines, and macromolecular amphoteric surfactants. Amphoteric surfactants from any of these classes may be further substituted with fluorocarbon substituents, siloxane substituents, or combinations thereof. Useful amphoteric surfactants can be found in Amphoteric Surfactants, ed. B. R. Bluestein and C. L. Hilton, Surfactant Series Vol. 12 Marcel Dekker NY, N.Y. (1982).

Initiation of emulsion polymerization may be carried out by the thermal decomposition of free radical precursors, also called initiators herein, which are capable of generating radicals suitable for initiating addition polymerization. Suitable thermal initiators such as, for example, inorganic hydroperoxides, inorganic peroxides, organic hydroperoxides, and organic peroxides, are useful at levels of from 0.05 percent to 5.0 percent by weight, based on the weight of monomers. Free radical initiators known in the art of aqueous emulsion polymerization include water-soluble free radical initiators, such as hydrogen peroxide, tert-butyl peroxide; alkali metal (sodium, potassium or lithium) or ammonium persulfate; or mixtures thereof. Such initiators may also be combined with reducing agents to form a redox system. Useful reducing agents include sulfites such as alkali metal meta bisulfite, or hyposulfite, sodium thiosulfate, or sodium formaldehyde sulfoxylate. The free radical precursor and reducing agent together, referred to as a redox system -herein, may be used at a level of from about 0.01% to 5%, based on the weight of monomers used. Examples of redox systems include t-butyl hydroperoxide/ sodium formaldehyde sulfoxylate/Fe(III) and ammonium persulfate/sodium bisulfite/sodium hydrosulfite/Fe(III). The polymerization temperature may be 10° C. to 110° C., depending upon such things as free radical initiator decomposition constant and reaction vessel pressure capabilities.

Frequently, a low level of chain transfer agent such as a mercaptan (for example: n-octyl mercaptan, n-dodecyl mercaptan, butyl or methyl mercaptopropionate, mercaptopropionic acid at 0.05 to 6% by weight based on total weight of monomer) is employed to limit the formation of any significant gel fraction or to control molecular weight.

The term "polycarbodiimide" used herein refers to a molecule bearing at least two carbodiimide groups and, optionally, other functional groups. The polycarbodiimide may contain aliphatically, cycloaliphatically, araliphatically, or aromatically bound carbodiimide groups, or combinations thereof. Aliphatically bound carbodiimide groups are preferred. Suitable polycarbodiimides are described in U.S. Pat. Nos. 5,258,481; 5,047,588; and EP-A-628,582; EP-A-241, 805; EP-A-277,361, and references therein. Most preferred is non-hydrophilicly modified polycarbodiimide bearing three to six reactive carbodiimide groups.

Preferred is a ratio of carbodiimide groups of the polycarbodiimide to the sum of groups reactive with carbodiimide of the aqueous emulsion polymer, groups reactive with carbodiimide of the alkoxysilane, and acid groups contained on any auxiliary formulation additives such as, for example, dispersants, on a molar basis of 1:5 to 5:1, more preferred is 1:3 to 3:1, most preferred is 1:1.5 to 1.5:1.

An alkoxysilane having at least one functional group reactive with carbodiimide functionality is any compound which contains at least one Si—O—C group and at least one Si—C—X group, where X is a carbodiimide-reactive group or an organic residue bearing a carbodiimide-reactive group. Preferred as carbodiimide-reactive groups for the alkoxysilane are carboxylic acid and mercapto groups. Preferred carbodiimide-reactive alkoxysilanes include N-(3-(triethoxysilyl)propyl)-succinic acid monoamide, 3-mercaptopropylmethyl dimethoxysilane, and 3-mercaptopropyltrimethoxysilane.

An alkoxysilane having at least one functional group reactive with the aqueous emulsion polymer is any compound which contains at least one Si—O—C group and at least one Si—C—X group, where X is a group or an organic residue bearing a group which is reactive with some functionality on the aqueous emulsion polymer. Preferred as polymer-reactive groups for the alkoxysilane are epoxy and amine groups. When the polymer-reactive group of the alkoxysilane is an epoxy moiety, carboxylic acids and amine are preferred as co-reactant groups residing on the aqueous emulsion polymer. When the polymer-reactive group of the alkoxysilane is an amine moiety, beta-dicarbonyl groups, such as acetoacetoxy moieties, are preferred as co-reactant groups residing on the aqueous emulsion polymer.

Preferred aqueous emulsion polymer-reactive alkoxysilanes include (3-glycidoxypropyl)methyldiethoxysilane, 3-glycidoxypropyltrimethoxysilane, 2-(3,4-epoxycyclohexyl)ethyl trimethoxysilane, N-(2-aminoethyl)-3-aminopropylmethyldimethoxysilane, N-(2-aminoethyl)-3-aminopropyltrimethoxysilane, 3-aminopropylmethyl diethoxysilane, 3-aminopropyl triethoxysilane, 3-aminopropyltrimethoxysilane, trimethoxysilylpropyldiethylenetriamine, 3-aminopropylmethoxy di(trimethylsiloxy)silane, and bis(2-hydroxyethyl)-3-aminopropyltriethoxysilane.

The preferred amount of alkoxysilane is from 0.01 to 10%, more preferably 0.1 to 5%, and most preferably 1 to 2% all by weight, based upon total dry weight of aqueous emulsion polymer.

The aqueous traffic-marking composition may be free of organic solvent or it may contain a coalescing solvent. The composition may contain typical coating additives such as binders, fillers, defoamers, crosslinkers, catalysts, surfactants, stabilizers, anti-flocculants, aqueous or non-aqueous solutions or dispersions of non-reactive polymer (by "non-reactive polymer" herein is meant polymer substantially free from carbodiimide or carbodiimide-reactive groups), tackifiers, coalescents, colorants, waxes, anti-oxidants, and pigments.

The traffic-marking composition may contain polyamines, as is taught in U.S. Pat. No. 5,527,853, or the aqueous emulsion polymer may itself be amine-functional, in order to achieve rapid setting. In this case, the traffic-marking composition must be formulated at sufficiently high pH using a volatile base to maintain paint stability.

The aqueous coating compositions of the present invention may be formed by admixing an aqueous emulsion polymer having at least two functional groups reactive with carbodiimide, a polycarbodiimide having at least two carbodiimide groups, and an alkoxysilane having at least one functional group reactive with either carbodiimide or the aqueous emulsion polymer, Alternatively, the aqueous coating compositions of the present invention may be formed by admixing an aqueous emulsion polymer having at least two functional groups reactive with carbodiimide with a polycarbodiimide bearing at least one alkoxysilane group. Admixing is achieved using conventional mixing techniques, including mechanical agitation such as, for example, stirring using a motor-driven stirring blade. The polycarbodiimide or the alkoxysilane may be previously dissolved or dispersed in a non-reactive solvent or in an aqueous medium or it may be dissolved or dispersed in the presence of the aqueous polymer dispersion.

When the composition includes an aqueous emulsion polymer containing groups reactive with both carbodiimide and the alkoxysilane, an alkoxysilane containing at least one group reactive with the aqueous emulsion polymer but no groups reactive with carbodiimide, and a polycarbodiimide, it is advantageous to premix the alkoxysilane and polycarbodiimide to form one member of a two-pack system, the second member of which is the aqueous emulsion polymer. When the composition includes an aqueous emulsion polymer containing groups reactive with carbodiimide functionality but no groups reactive with the alkoxysilane, an alkoxysilane containing at least one group reactive with carbodiimide functionality but no groups reactive with the aqueous emulsion polymer, and a polycarbodiimide, it is advantageous to premix the alkoxysilane and the aqueous emulsion polymer to form one member of a two-pack system, the second member of which is the polycarbodiimide. As combining members of these two-pack systems leads to reaction, providing crosslinked polymeric film, it is advantageous to maintain the composition as a two component or two-pack system, admixing shortly before use. Pot-lives are typically 4 to 24 hours at 25° C. Preferred is a two-pack system wherein one pack includes the aqueous emulsion polymer bearing groups reactive with both carbodiimide functionality and the alkoxysilane and, optionally, pigment and other coating additives, and a second pack including the polycarbodiimide and an alkoxysilane containing at least one group reactive with the aqueous emulsion polymer, but no groups reactive with the carbodiimide.

When the polycarbodiimide and the alkoxysilane are separate entities, it is often advantageous to maintain the aqueous coating composition as a three pack composition (polycarbodiimide; alkoxysilane; and aqueous emulsion polymer) until shortly before use.

The aqueous coating compositions of the present invention may be applied to the surface of any substrate for which a coating is required for protective or aesthetic reasons. Examples of these surfaces include the surfaces of interior and exterior walls, railings, furniture, appliances, vehicles, and roads. Used as aqueous traffic-marking compositions, the coating compositions of the present invention may be applied to roads, parking lots, and the like, typically to concrete and asphalt surfaces. The traffic-marking composition of this invention may be applied by methods well known in the art such as air-assisted spray, airless spray, plural component spray, brush, roller squeegee, and the like.

After the crosslinkable composition is applied to a substrate, the composition dries or is caused to dry. Drying to yield useful properties may take place at a convenient rate at ambient temperatures such as, for example, from 5° C. to 35° C. A typical drying condition is 23° C. at 50% relative humidity.

All ranges used herein are inclusive and combinable.

GLOSSARY

The listed terms have the following meaning in this document:
$N_2$=nitrogen gas
Solids content=% solids=(weight of solids/total weight of material)*100%
Mn=number average molecular weight
SEM=sulfoethyl methacrylate
pCDI=polycarbodiimide
TMC=traffic-marking composition
k=1000
alkoxysilane-functional pCDI=polycarbodiimide bearing at least one alkoxysilane moiety
polymer-reactive alkoxysilane=alkoxysilane bearing at least one group reactive with the aqueous emulsion polymer
CDI-reactive alkoxysilane=alkoxysilane bearing at least one group reactive with carbodiimide functionality
TAMOL™ 901 Dispersant, an ammonium salt of polyelectrolyte supplied by Rohm and Haas Company, Philadelphia, Pa. @ 30 percent by weight.
SURFYNOL™ CT-136 Surfactant, an acetylenic surfactant supplied by Air Products and Chemicals, Inc., Allentown, Pa.
DREW™ L-493 Defoamer supplied by Drew Chemical Company, Boonton, N.J.
TIPURE™ R-900 Titanium dioxide supplied by E. I. duPont de Nemours & Company, Wilmington, Del.
OMYACARB™ 5, Ground natural calcium carbonate, evaluated under ASTM D 1199, Type GC, Grade II having a number average particle size of 5.5 microns with maximum oil absorption No. of 10, supplied by Omya, Inc., Proctor, Vt.
TEXANOL™ Ester alcohol supplied by Eastman Chemicals, Kingsport, Tenn.
TREM™ LF-40 is a sulfonate-functional polymerizable surfactant Ask Ann G6720 is 3-glycidoxypropyltrimethoxysilane, available from United Chemical Technologies, Hartford, Conn.
M8500 is 3-mercaptopropyltrimethoxysilane, available from United Chemical Technologies, Hartford, Conn.
UCARLNK™ XL-29SE, available from United Carbide, Danbury, Conn.
AASTO M-247 20/80 mesh glass beads PROXEL™ GXL is a biocide available from Zeneca, Wilmington, Del.
TRITON™ X-405 is available from Rohm and Haas Company, Philadelphia, Pa.
NATRASOL™ 250HR is a hydroxyethylcellulose thickener available from Hercules Incorporated, Aqualon Division, Wilmington, Del.

EXAMPLE 1

Preparation of aqueous emulsion polymer having at least two functional groups reactive with carbodiimide functionality. In this example, the functional groups reactive with carbodiimide functionality are carboxylate moieties incorporated as polymerized units deriving from methacrylic acid.

A stirred reaction kettle containing 914 grams of deionized water was heated under nitrogen atmosphere to 85° C. To the heated kettle, 15.5 grams of sodium lauryl sulfate, 7.6 grams of sodium carbonate and 7.8 grams of sodium persulfate were added. A monomer emulsion mixture was prepared by mixing 869 grams of deionized water with 15.5 grams of sodium lauryl sulfate, 992 grams of butyl acrylate, 1155 grams of methyl methacrylate, and 28.3 grams of methacrylic acid. 180 grams of the monomer emulsion mixture was then added to the heated kettle. The remainder of the monomer emulsion mixture was then gradually added to the reaction kettle, followed by 50 grams of deionized water. The reaction kettle was then cooled and 0.01 grams of ferrous sulfate dissolved in 1 gram of deionized water was added, followed by a total of 1.76 grams of tertiary butylhydrogen peroxide dissolved in 40 grams of deionized water and 0.88 grams of sodium sulfoxylate formaldehyde dissolved in 30 grams of deionized water. Following this addition, 50 grams of aqueous ammonia was added. Finally, 95.4 grams of 27% solids by weight of aqueous solution of polyoxazolidinoethyl meth-acrylate, followed by 70 grams of deionized water were added to the reaction kettle to complete the process.

The binder polymer of Example 1 had a particle size of 180 nm, a solids content of 50% by weight, a pH of 9.9, and a viscosity of less than 250 centipoise.

EXAMPLE 2

Preparation of aqueous emulsion polymer having at least two functional groups reactive with carbodimide functionality. In this example, the functional groups reactive with carbodiimide functionality are sulfonate moieties incorporated as polymerized units deriving from sulfoethyl methacrylate monomer, and from the free radical initiator fragments of ammonium persulfate.

To 922 g of deionized (DI) water under a nitrogen ($N_2$) atmosphere at 90° C. were added 5.2 g ammonium persulfate dissolved in 35 g DI water and 157 g polymer seed latex (solids content 42%; average particle diameter of 60 nm), followed by 50 g of DI water to form a reaction mixture to which the following monomer mixture was then added over 3 hours at 81° C., along with a solution of 2.6 g ammonium persulfate dissolved in 100 g DI water, followed by 50 g DI water.

| Components of Monomer Mixture | Weight of Component in grams (g) |
|---|---|
| DI water | 730 |
| Sodium lauryl sulfate (28% active) | 30.9 |
| butyl acrylate | 994 |
| methyl methacrylate | 1123 |
| sulfoethyl methacrylate | 43 |

At the end of the polymerization, 0.01 g FeSO4 in 9 g DI water, 0.01 g versene in 1 g DI water, 3.6 g t-butylhydroperoxide in 20 g DI water and 1.2 g isoascorbic acid in 20 g DI water were added at 60° C. to the reaction product. Ammonium hydroxide was added to give a final pH=10.7, followed by the addition of 6.2 g Proxel GXL and 6 g DI water. The resulting latex polymer had a solids content of 50.7% and an average particle diameter of 196 nm.

EXAMPLE 3

Preparation of aqueous emulsion polymer having at least two functional groups reactive with carbodiimide functionality. In this example, the functional groups reactive with carbodiimide functionality are sulfonate moieties incorporated as polymerized units deriving from the sulfonate-functional, polymerizable surfactant TREM™ LF-40 and initiator ammonium persulfate.

To 1034 g of deionized (DI) water under a nitrogen atmosphere at 90° C. were added 5.2 g ammonium persulfate dissolved in 35 g DI water and 157 g polymer seed latex (solids content 42% average particle diameter of 60 nm), followed by 50 g of DI water to form a reaction mixture to which the following monomer mixture was then added over 3 hours at 81° C., along with a solution of 2.6 g ammonium persulfate dissolved in 100 g DI water followed by 50 g DI water.

| Components of Monomer Mixture | Weight of Component in grams (g) |
|---|---|
| DI water | 730 |
| TREM LF-40 | 104 |
| butyl acrylate | 994 |
| methyl methacrylate | 1166 |

At the end of the polymerization, 0.01 g FeSO4 in 9 g DI water, 0.01 g versene in 1 g DI water, 3.6 g t-butylhydroperoxide in 20 g DI water and 1.2 g isoascorbic acid in 20 g DI water were added at 60° C. to the reaction product. Ammonium hydroxide was added to give a final pH=10.7, followed by the addition of 6.2 g Proxel GXL and 6 g DI water. The resulting latex polymer had a solids content of 50.4% and an average particle diameter of 200 nm.

EXAMPLE 4

Preparation of aqueous emulsion polymer having at least two functional groups reactive with carbodiimide functionality. In this example, the functional groups reactive with carbodiimide functionality are sulfonate moieties incorporated as polymerized units deriving from sulfoethyl methacrylate (SEM) monomer, and from the free radical initiator fragments of ammonium persulfate.

To 900 g of deionized (DI) water under a nitrogen atmosphere at 90° C. were added 5.1 g ammonium persulfate dissolved in 35 g DI water and 157 g polymer seed latex (solids content 42% average particle diameter of 60 nm), followed by 50 g of DI water to form a reaction mixture to which the following monomer mixture was then added over 3 hours at 81° C., along with a solution of 2.5 g ammonium persulfate dissolved in 100 g DI water, followed by 50 g DI water.

| Components of Monomer Mixture | Weight of Component in grams (g) |
|---|---|
| DI water | 730 |
| Sodium lauryl sulfate (28% active) | 30.9 |
| butyl acrylate | 994 |
| methyl methacrylate | 1069 |
| sulfoethyl methacrylate | 97 |

At the end of the polymerization, 0.01 g FeSO4 in 9 g DI water, 3.6 g t-butylhydroperoxide in 40 g DI water and 1.2 g isoascorbic acid in 80 g DI water were added at 60° C. to the reaction product. Ammonium hydroxide was added to give a final pH=8.8, followed by the addition of 6.2 g Proxel GXL and 6 g DI water. The resulting latex polymer had a solids content of 50.5% and an average particle diameter of 206 nm.

EXAMPLE 5

Preparation of alkoxysilane having at least one functional group reactive with carbodiimide functionality. In this example, the functional group reactive with carbodiimide functionality is the carboxylate moiety deriving from succinic anhydride.

A 100 ml 3-neck round bottom flask was out-fitted with a $N_2$ inlet tube, reflux condenser, thermometer, and magnetic stirrer. Into the flask were placed 25.0 g of 3-aminopropyltriethoxysilane, 11.3 g of succinic anhydride, and 11.5 g of triethylamine. The flask was purged with $N_2$, and the mixture was heated to 100° C. for 4 hrs, then cooled to room temperature. The resulting acid-functional alkoxysilane, N-(3-(triethoxysilyl)propyl)-succinic acid monoamide, was 75.9% solids.

EXAMPLE 6

Preparation of a Polycarbodiimide

A 250 ml 3-neck round bottom flask was out-fitted with a $N_2$ inlet tube, reflux condenser, thermometer, and magnetic stirrer. Into the flask were placed 50.0 g octyl isocyanate, 125.28 g isophorone duisocyanate, and 5.0 g 3-methyl-1-phenyl-2-phospholene-1-oxide. The flask was purged with $N_2$, and the mixture heated to 100° C. for 1 hr, then to 140° C. for 1 hr. The $N_2$ was then sparged directly into the mixture while continuing to heat at 140° C. for an additional 11 hrs. 136.5 g of product was poured out of the flask and dissolved in 64.4 g of acetone. Measured solids content was 72.1%. The polycarbodiimide had a calculated Mn of 889 g/mole and an average functionality of 4.5 carbodiimide units.

EXAMPLE 7

Preparation of an Alkoxysilane-functional Polycarbodiimide (alkoxysilane-functional pCDI)

A 250 ml 3-neck round bottom flask was out-fitted with a $N_2$ inlet tube, reflux condenser, thermocouple, and a motor driven overhead stirrer. Into the flask were placed 24.5 g isocyanatopropyl triethoxysilane, 44.04 g isophorone diisocyanate, 38.43 g diisobutyl ketone, and 2.06 g 3-methyl-1-phenyl-2-phospholene-1-oxide. The mixture was sparged with $N_2$ and stirred until the phospholene oxide had dissolved, then the mixture was heated to 120° C. for 11 hr, while sparging with $N_2$. Measured solids content was 64.0%. The polycarbodiimide had a calculated Mn of 1164 g/mole and an average carbodiimide functionality of 5.

EXAMPLE 8

Preparation of Traffic-marking Compositions

Traffic-marking compositions (TMC 1-8) and Comparative Samples A–B (designated Comp. A and Comp. B) were prepared according to the following formulations. The ingredients were added in the order given (Table 1.1) under low shear laboratory mixing. After addition of the Omyacarb®-5, stirring was continued for 15 minutes before the addition of the remaining ingredients. The ingredients used in the preparation of intermediate base paints P1-P4 are presented in Table 1.1. The intermediate base paints were then used in the preparation of traffic marking compositions TMC-1 to TMC-8 and Comparative Samples A-B. The ingredients, presented in Tables 1.2 to 1.4, were added in the order given under low shear laboratory mixing.

TABLE 1.1

Ingredients for intermediate base paint compositions P1–P4 for use in traffic marking compositions.

| Base Paint | P1 | P2 | P3 | P4 |
|---|---|---|---|---|
| Emulsion polymer | 460.1 g | 46.0 g | 46.0 g | 3808.2 g |
| (solids as supplied) | Example 1 | Example 2 | Example 3 | Example 4 |
| Polymer Functional group | 1.3 wt. % MAA | 2.0 wt. % SEM | 5.0 wt. % TREM | 4.5 wt. % SEM |
| polyamine[a] |  | 1.06 | 1.06 | 83.0 |
| 14% $NH_3$ |  |  |  | 125.0 |
| Triton X-405 |  | 0.33 | 0.33 | 27.5 |
| Tamol 901 | 7.2 | 0.72 | 0.72 | 60.2 |
| Surfynol CT-136 | 2.8 | 0.28 | 0.28 | 23.4 |
| Drew L-493 | 2.0 | 0.20 | 0.20 | 16.7 |
| TiPure ® R-900 | 100.0 | 10.0 | 10.0 | 835.9 |
| Omyacarb ®-5 | 760.1 | 76.0 | 76.0 | 6358.4 |
| MeOH[b] | 30.0 | 3.0 | 3.0 | 250.8 |
| Texanol[b] | 23.0 | 2.3 | 2.3 | 192.3 |
| water[b] | 11.6 | 1.16 | 1.16 | 97.0 |
| water |  |  |  | 200.0 |
| Drew L-493 | 3.5 | 0.35 | 0.35 | 55.1 |
| Natrasol 250HR | 7.0 |  |  | 58.4 |

All of the quantities in these columns are in grams (g).

[a]poly-oxazolidinoethyl methacrylate at 27.1% solids
[b]premixed prior to adding to paint

TABLE 1.2

Ingredients used in the preparation of traffic marking compositions TMC-1 to TMC-4 and Comparative Samples A.

| TMC-Base Paint | 1<br>100 g<br>P1 | 2<br>100 g<br>P1 | 3<br>100 g<br>P1 | 4<br>100 g<br>P1 | Comp.[a] A<br>100 g<br>P1 |
|---|---|---|---|---|---|
| Example 5 |  | 0.71 |  |  |  |
| Example 6 |  | 1.20 | 1.20 | 1.20 | 1.20 |
| Example 7 | 1.59 |  |  |  |  |
| G6720[b] |  |  |  | 0.40 |  |
| M8500[b] |  |  | 0.33 |  |  |

All of the quantities in these columns are in grams (g).

[a]Comp. = Comparative Experimental
[b]G6720 is 3-glycidoxypropyltrimethoxysilane; M8500 is 3-mercaptopropyltrimethoxysilane; both from United Chemical Technologies.

TABLE 1.3

Ingredients used in the preparation of traffic marking compositions TMC-5 to TMC-7 and Comparative Sample B.

| TMC-Base Paint | 5<br>118 g<br>P2 | 6<br>115.2 g<br>P3 | 7<br>120 g<br>P1 | 9<br>119 g<br>P4 | Comp.[a] B<br>131.5 g<br>P4 |
|---|---|---|---|---|---|
| UCARLNK XL-29SE | 3.33 | 3.25 | 4.18 | 6.37 |  |
| water[b] | 0.77 | 0.75 | 0.78 | 0.75 | 0.83 |
| G6720[b,c] | 0.38 | 0.37 | 0.39 | 0.37 | 0.41 |

All of the quantities in these columns are in grams (g).

[a]Comp. = Comparative Experimental
[b]premixed
[c]G6720 is 3-glycidoxypropyltrimethoxysilane

TABLE 1.4

Ingredients used in the preparation of traffic marking composition TMC-8.

| TMC-Base Paint | 8<br>4792 g<br>P4 |
|---|---|
| UCARLNK XL-29SE[a] | 212.2 g |
| water[a] | 424.4 g |
| G6720[b] | 13.1 g |

[a]premixed
[b]G6720 is 3-glycidoxypropyltrimethoxysilane

EXAMPLE 9

Testing of Wear Resistance of Applied Traffic Marking Composition

Test panels were prepared by spraying coatings of traffic marking compositions, base paints, or comparative samples onto very smooth concrete with no exposed aggregate (product of Patio Concrete Co) using conventional air spray to a wet film thickness of 0.38 mm. (15 mils). The coatings were dried at room temperature for 16 hours prior to wear testing The wear test measures the durability or wear resistance of a coating under accelerated conditions by contacting the surface repeatedly with rolling wear wheels under pressure through a curved path. The panel is cycled between wet and dry testing; the number of cumulative rotations of the Trafficometer wheel dolly is listed for each panel rating in 1000's of rotations. The Trafficometer device is described in Copending U.S. Provisional Patent Application No. 60/029, 973. Wear data is presented in Tables 2.1 and 2.2 as the area of paint removed from the panel. Table 2.1 results are in $cm^2$. Table 2.2 results are in % of total possible area removed. Panel is cycled between wet and dry testing; the number of cumulative rotations of the Trafficometer wheel dolly in listed for each panel rating in units of 1000 (=k) of rotations.

TABLE 2.1

Wear Testing Results

| | TMC-1 | TMC-2 | TMC-3 | TMC-4 | P1 | Comp.[a] A |
|---|---|---|---|---|---|---|
| pCDI | | X | X | X | | X |
| alkoxysilane-functional pCDI | X | | | | | |
| polymer-reactive Alkoxysilane | | | | X | | |
| CDI-reactive Alkoxysilane | | X | X | | | |
| wet | | | | | | |
| 0.7 k | 0.1 | 0.1 | 0 | 0 | 0.3 | 0 |
| 1.9 k | 0.3 | 3.3 | 0.3 | 0 | 2.5 | 0.3 |
| 3.2 k | 1.0 | 7.2 | 1.3 | 0 | 5 | 0.6 |
| 5.1 k | 1.0 | 12 | 1.9 | 0 | 6.3 | 2 |
| 9.2 k | 1.0 | 18 | 1.9 | 0 | 16 | 6.3 |
| 15.5 k | 1.3 | 35 | 2.5 | 0 | 25 | 6.3 |
| 23.1 k | 1.3 | 38 | 2.5 | 0 | 30 | 8.8 |
| 31.2 k | 1.3 | 38 | 2.5 | 0 | 50 | 19 |
| dry 42.0 k | 1.3 | 43 | 2.5 | 0 | 50 | 20 |
| wet | | | | | | |
| 47.4 k | 1.3 | 43 | 2.5 | 0 | 55 | 20 |
| 161 k | 1.3 | 43 | 2.5 | 0 | 100 | 20 |
| dry 169 k | 1.3 | 44 | 2.5 | 0 | 100 | 45 |
| wet 177 k | 1.3 | 46 | 2.5 | 0 | 140 | 45 |
| dry 214 k | 1.3 | 46 | 2.5 | 0 | 140 | 48 |
| wet 330 k | 1.3 | 46 | 2.5 | 0 | 140 | 88 |
| dry | | | | | | |
| 349 k | 1.3 | 46 | 2.5 | 0 | 140 | 88 |
| 378 k | 1.3 | 46 | 2.5 | 0 | 140 | 88 |
| wet 494 k | 1.3 | 56 | 2.5 | 0 | 140 | 88 |
| Cumulative Wear Cycles (k = 1000 cycles) | Area (cm²) of Paint Removed from Surface | | | | | |

[a]Comp. = Comparative

The wear testing results of Table 2.1 show that the combination of alkoxysilane with carbodiimide enhances wear resistance compared with the traffic marking paint without carbodiimide, and with carbodiimide as the sole crosslinking agent. The combination of CDI-reactive Alkoxysilane with carbodiimide enhances the wear resistance of the composition containing carboxy functional polymer (compare TMC-2 and TMC-3 with P1 and Comp A). The combination of polymer-reactive alkoxysilane with carbodiimide enhances the wear resistance of the composition containing carboxy functional polymer (compare TMC-4 with P1 and Comp A). Alkoxysilane-functional polycarbodiimide (pCDI) is particularly effective at enhancing the wear resistance of the same carboxy functional polymer containing composition (compare TMC-1 with P1 and Comp A).

TABLE 2.2

Wear Testing Results

| | TMC-5 | TMC-6 | TMC-7 | P1 | TMC-9 | Comp.[a] B |
|---|---|---|---|---|---|---|
| pCDI | | | | | | |
| Alkoxysilane-functional pCDI | X | X | X | | X | |
| polymer-reactive Alkoxysilane | X | X | X | | X | X |
| CDI-reactive Alkoxysilane | | | | | | |
| dry 111 k | 0 | 0 | 0 | 0 | 0 | 0 |
| wet | | | | | | |
| 112 k | 1.3 | 0 | 0 | 5 | 10 | 50 |
| 114 k | 13 | 0.3 | 0 | 20 | 100 | 100 |
| 117 k | 20 | 0.5 | 0 | 40 | 100 | 100 |
| 121 k | 48 | 0.5 | 0 | 50 | 100 | 100 |
| 130 k | 48 | 0.5 | 0 | 50 | 100 | 100 |
| 140 k | 50 | 5 | 0 | 50 | 100 | 100 |
| dry 169 k | 50 | 5 | 0 | 50 | 100 | 100 |

TABLE 2.2-continued

Wear Testing Results

| | TMC-5 | TMC-6 | TMC-7 | P1 | TMC-9 | Comp.[a] B |
|---|---|---|---|---|---|---|
| wet | | | | | | |
| 177 k | 100 | 5 | 0 | 50 | 100 | 100 |
| 330 k | 100 | 15 | 0 | 100 | 100 | 100 |
| dry 351 k | 100 | 15 | 0 | 100 | 100 | 100 |
| wet 502 k | 100 | 15 | 0 | 100 | 100 | 100 |
| dry 558 k | 100 | 15 | 0 | 100 | 100 | 100 |
| wet 1550 k | 100 | 15 | 0 | 100 | 100 | 100 |
| Cumulative Wear Cycles (k = 1000 cycles) | colspan Area of Paint Removed from Surface, as % of total Paint Area | | | | | |

[a]Comp. = Comparative

The wear testing results of Table 2.2 indicate that the combination of polymer-reactive alkoxysilane with carbodiimide enhances wear resistance compared with the traffic marking paint without carbodiimide and polymer-reactive alkoxysilane (compare TMC-7 to P1), and compared with the traffic marking paint containing polymer-reactive alkoxysilane, but absent carbodiimide (compare TMC-9 to Comp B). All of these compositions contain sulfonate functional polymers except P1 and TMC-7, which contain carboxy functional polymers. The enhanced performance of TMC-6 compared with TMC-5 is thought to derive from the decreased water sensitivity of the TREM LF-40 sulfonate monomer compared to the SEM monomer.

EXAMPLE 10

Testing of Wear Resistance of Applied Traffic Marking Composition

Traffic marking compositions and base paint were spray applied to surface of highway route RT-183 in Austin, Tex. at a wet film thickness of 15 mil in a transverse test deck. Lines were applied both with AASTO M-247 20/80 mesh glass beads and with no beads. Durability was rated as the percentage of paint removed from the wheel track areas. Durability data is given in Table 3.

TABLE 3

Wear Testing Results

| | TMC-8 | P4 | TMC-8 | P4 |
|---|---|---|---|---|
| pCDI | X | | X | |
| Si-functional pCDI | | | | |
| polymer-reactive Si | X | | X | |
| CDI-reactive Si | | | | |
| beads | yes | yes | no | no |
| 14 days | 0 | 70 | 22 | 90 |
| 43 days | 22 | 100 | 42 | 100 |
| 105 days | 32 | 100 | 70 | 100 |
| 251 days | 62 | 100 | 80 | 100 |
| Days after application of traffic marking composition | colspan Area of Paint Removed from Surface, as % of total Paint Area | | | |

Compositions TMC-1 to TMC-9 of this invention exhibit superior wear resistance in comparison to Comparatives A, B, P1, and P4.

I claim:

1. A composition comprising:
    (a) a polycarbodiimide having at least two carbodiimide groups;
    (b) an aqueous emulsion polymer; and
    (c) an alkoxysilane;
      wherein said aqueous emulsion polymer has at least two functional groups reactive with said carbodiimide groups and at least one functional group reactive with said alkoxysilane; and
      wherein said alkoxysilane has at least one functional group reactive with said aqueous emulsion polymer.
2. The composition of claim 1,
    wherein said at least one functional group of said aqueous emulsion polymer is selected from the group consisting of carboxylic acid and amine.
3. The composition of claim 1,
    wherein said at least one functional group of said alkoxysilane is an epoxy.
4. The composition of claim 1,
    wherein said at least one functional group of said aqueous emulsion polymer is a 1,3-diacarbonyl.
5. The composition of claim 1,
    wherein said at least one functional group of said alkoxysilane is an amine.
6. A method for producing a wear-resistant coating on a surface of a substrate comprising:
    (1) applying to said surface a layer of coating composition comprising:
      (a) a polycarbodiimide having at least two carbodiimide groups;
      (b) an aqueous emulsion polymer; and
      (c) an alkoxysilane;
        wherein said aqueous emulsion polymer has at least two functional groups reactive with said carbodiimide groups and at least one functional group reactive with said alkoxysilane; and
        wherein said alkoxysilane has at least one functional group reactive with said aqueous emulsion polymer; and
    (2) allowing said coating composition to dry.
7. The method of claim 6,
    wherein said at least one functional group of said aqueous emulsion polymer is selected from the group consisting of carboxylic acid and amine.
8. The method of claim 6,
    wherein said at least one functional group of said alkoxysilane is an epoxy.
9. The method of claim 6,
    wherein said at least one functional group of said aqueous emulsion polymer is a 1,3-diacarbonyl.
10. The method of claim 6,
    wherein said at least one functional group of said alkoxysilane is an amine.

11. A method for producing a wear-resistant coating on a surface of a substrate comprising:
(1) applying to said surface a layer of coating composition comprising:
(a) a polycarbodiimide having at least two carbodiimide groups;
(b) an aqueous emulsion polymer; and
(c) an alkoxysilane;
wherein said aqueous emulsion polymer has at least two functional groups reactive with said carbodiimide groups; and
wherein said alkoxysilane has least one functional group reactive with said carbodiimide groups; and
(2) allowing said aqueous coating composition to dry.

12. The method of claim 11,
wherein said at least two functional groups of said aqueous emulsion polymer are acid functional.

13. The method of claim 11,
wherein said at least one functional group of said alkoxysilane is selected from the group consisting of carboxylic acid and mercaptan.

14. A method for producing a wear-resistant traffic marking on a road surface comprising:
(1) applying to said road surface a layer of a traffic marking composition comprising:
(a) an aqueous emulsion polymer; and
(b) a polycarbodiimide having at least two carbodiimide groups;
wherein said aqueous emulsion polymer has at least two functional groups reactive with said carbodiimide groups; and
wherein said polycarbodiimide has at least one alkoxysilane group; and
(2) allowing said traffic marking composition to dry.

15. The method of claim 14, wherein said at least two functional groups of said aqueous emulsion polymer are acid functional.

* * * * *